April 30, 1946. L. M. WILLIAMS 2,399,528
LENGTH IN TERMS OF WEIGHT MEASURING DEVICE
Filed Dec. 8, 1944 2 Sheets-Sheet 1

Lloyd M. Williams,
Inventor

By Clarence A. O'Brien
and Harvey B. Jacobson
Attorneys

April 30, 1946.    L. M. WILLIAMS    2,399,528
LENGTH IN TERMS OF WEIGHT MEASURING DEVICE
Filed Dec. 8, 1944    2 Sheets-Sheet 2
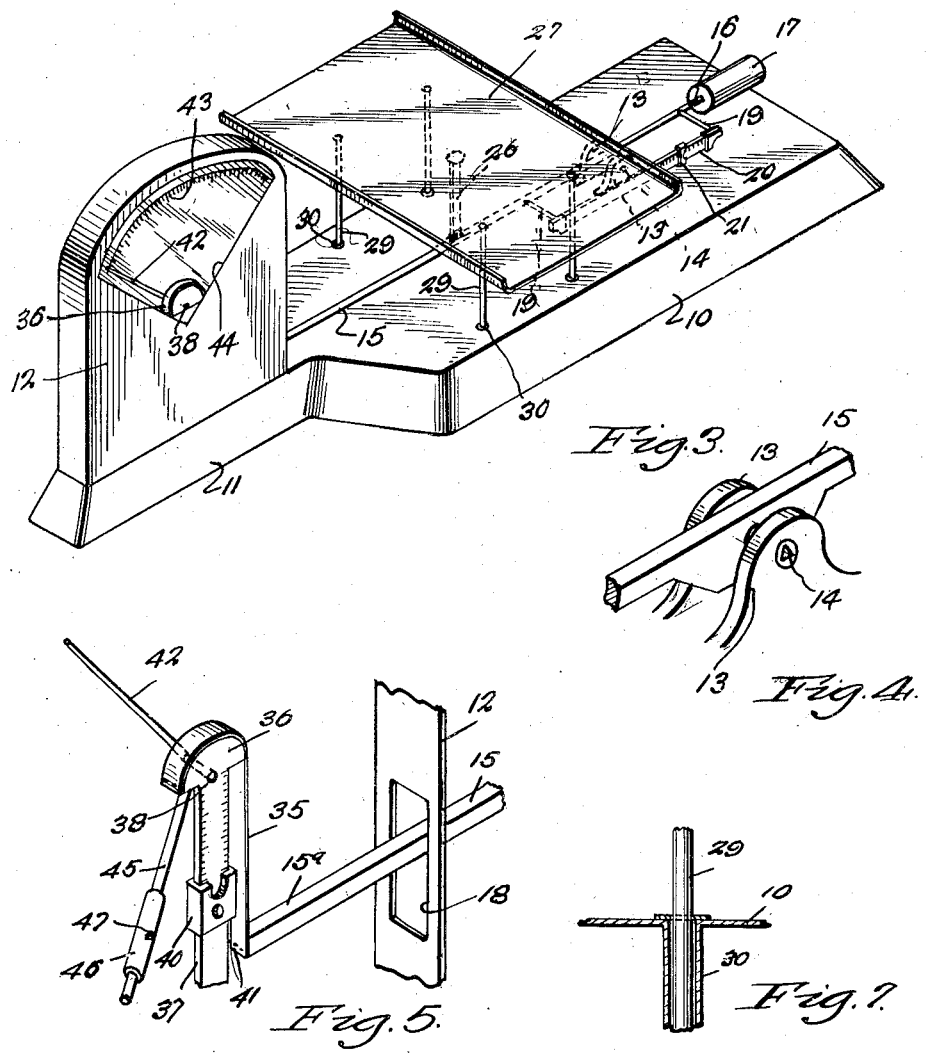
Lloyd M. Williams,
Inventor
By Clarence A. O'Brien
and Harvey B. Jacobson
Attorneys Patented Apr. 30, 1946

2,399,528

UNITED STATES PATENT OFFICE 2,399,528

LENGTH IN TERMS OF WEIGHT MEASURING DEVICE

Lloyd M. Williams, Chesapeake, Ohio

Application December 8, 1944, Serial No. 567,216

1 Claim. (Cl. 265—36)

This invention relates to a measuring device, and more particularly to such a device adapted to measure quantity in accordance with weight.

A primary object of this invention is the provision of a device adapted to measure the length of rolled material, as for example a bolt of cloth, without the necessity of unrolling the same.

An additional object is the provision of a device which will measure such rolled goods accurately and effectively, in accordance with the weight of the roll.

A still further object of this invention is the provision of a device provided with means whereby the length of rolls of goods of various weights may be accurately determined.

A more specific object of this invention is the provision of means whereby compensation may be made for the core or reel about which the rolled goods are rolled.

Still another specific object of the invention is the provision of a calibrating device whereby the scale and measuring device may be accurately set at zero regardless of temperature or other influencing conditions.

Additional objects reside in the combinations of elements, arrangements of parts, and features of construction, all as will be more fully pointed out hereinafter and disclosed in the accompanying drawings, wherein there is shown a preferred form of this inventive concept.

In the drawings—

Figure 3 is a perspective view of the device shown in Figures 1 and 2, certain operating parts thereof being indicated in dotted lines.

Figure 4 is a perspective view of a constructional detail.

Figure 5 is a perspective view of the adjusting means whereby the length of goods of varying weights may be computed, and certain associated parts.

Figure 6 is an enlarged detail view of certain operating parts of the mechanism, and Figure 7 is an enlarged sectional view taken substantially along the line 7—7 of Figure 2, parts thereof being broken away.

Like reference numerals refer to like parts throughout the several views of the drawings.

Figure 1:
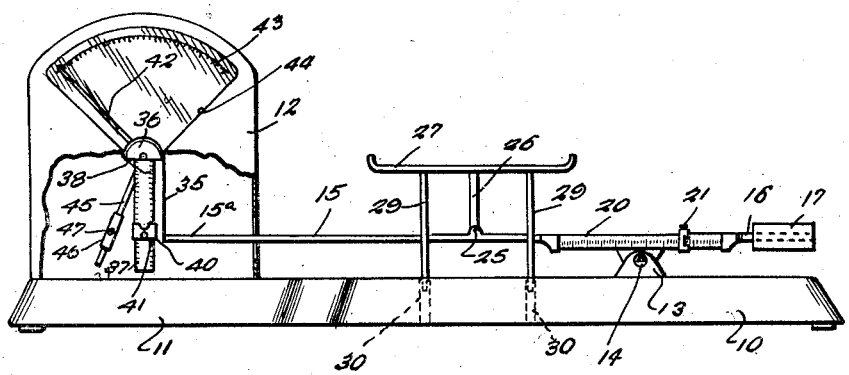
Figure 1 is a side elevational view of one form of device embodying this invention, certain parts thereof being broken away.
Figure 2:
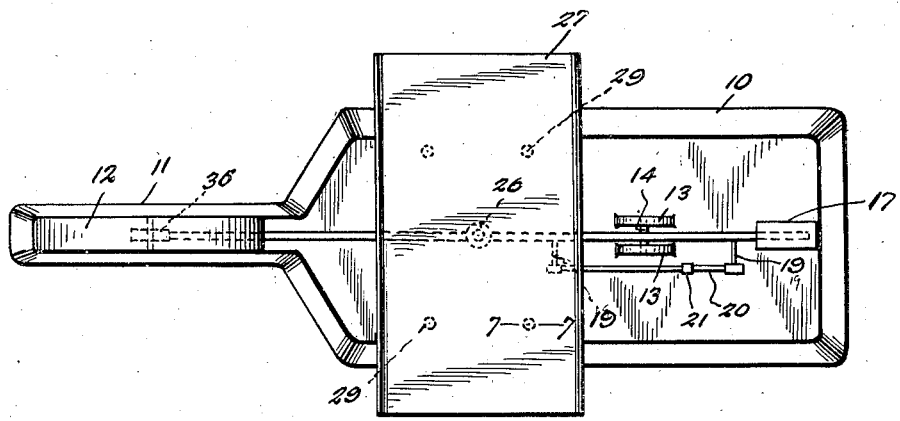
Figure 2 is a top plan view of the device shown in Figure 1.

Having reference now to the drawings, a base 10 is provided with a tapered elongated portion 11 upon which is positioned a housing 12. An intermediate portion of the base 10 is provided with two upstanding lugs 13 between which extends a knife edge 14 (see Figure 3), upon which is mounted and balanced a weighing arm 15. One end of arm 15 extends outwardly beyond knife edge 14 and is threaded, as at 16, for the accommodation of a conventional adjusting weight 17 having a threaded bore therein. The other end 15a, of arm 15 extends through an aperture 18 in the side wall of housing 12, for a purpose to be described hereinafter.

Arms 19 extend outwardly horizontally from weighing arm 15 at a point adjacent knife edge 14, and on opposite sides thereof, and support an adjustable, calibrated tare weight counterbalancing means 20, upon which is slidably mounted an adjustable weight 21.

Pivotally secured as by a pivot pin 25 to an intermediate point between knife edge 14, and end 15a of arms 15, is a supporting rod 26 adapted to have secured to its upper extremity a weighing pan 27. Guide rods 29 secured to the lower side of weighting pan 27 extend downwardly in the sleeves 30 in base 10 for the purpose of insuring proper alignment of the pan when the arm 15 is deflected.

From the foregoing it will now be seen that when a weight is placed on weighing pan 27 the arm 15 is adapted to move downwardly, in the manner similar to that of a conventional scale.

Having particular reference now to the mechanism for converting the weight of the article placed on weighing pan 27 into terms of linear measurements, the end 15a of arm 15 has secured thereto, within housing 12, a flexible band or strip 35, the opposite end of which extends over and is secured to, an arcuate segment 36 of an adjustable calibrated depending means 37, which is pivoted as on a knife edge 38 within housing 12. Member 37 is graduated and has slidably positioned thereon a weight 40 provided with a set screw 41 for holding the same in a desired position of adjustment adjacent selected graduations. An indicator arm 42 is fixedly secured to segment 36 and positioned in front of a scale 43 visible through a suitable opening 44 in the front wall of housing 12.

Means are also provided for setting the pointer 42 to zero setting on the scale 43 in accordance with the other component parts of the device, such means taking the form of an angularly and downwardly extending arm 45 on which is slidably mounted a weight 46 adapted to be held in adjusted position as by a set screw 47.

From the foregoing the method of use and operation of the device should now be readily understandable. In the event that the weight of a given length from a particular type of goods to be measured is known, the bolt is merely placed on the weighing pan 27, the weight 40 adjusted to the desired indicating marks for goods of that weight, and the weight 21 adjusted to compensate for the weight of the core on which the goods are rolled, which is presumably known, and the resultant length read off in yards by the position of pointer 42 on dial 43.

In the event that the particular weight of the goods to be measured is not known it is a comparatively simple matter to measure one bolt of the material in the conventional manner, as well as weigh its associated core, and then having placed a roll on the weighing pan 27 to adjust weights 21 and 40 until the pointer indicates the previously determined length. After this operation has been performed, the length of all subsequent rolls of similar goods may be read off directly from the pointer and dial.

From the foregoing it will now be seen that there is herein provided a measuring device particularly adapted for the measurements of rolled goods while in rolled conditions, which is of particular utility to stores and dry goods dealers, when taking inventory, or under similar conditions. It will also be seen that there is herein provided a device which accomplishes all the objects of this invention and many others including advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

In a device of the character described, in combination, a base, a beam pivoted thereon, a weighing pan associated with said beam and having guiding means therefor, said guiding means including a plurality of spaced sleeves extending through said base and a plurality of guide rods secured to the bottom of said pan and extending downwardly through said sleeves, a flexible member secured to an end of said beam, an adjustable, calibrated depending means having an arcuate extremity pivotally mounted adjacent said end of said beam, said flexible member passing over and secured to said arcuate extremity, a weight adjustably mounted on said depending means, indicating means associated with said extremity, and an adjustable, calibrated tare weight counter-balancing means adjacent the pivotal support for said beam.

LLOYD M. WILLIAMS.